(12) United States Patent
Smith

(10) Patent No.: US 6,454,214 B1
(45) Date of Patent: Sep. 24, 2002

(54) DEVICE AND METHOD FOR CONNECTING TWO PARTS OF A CRAFT

(75) Inventor: Shawn H. Smith, Boulder, CO (US)

(73) Assignee: Saab Ericsson Space AB, Göteborg (SE)

(*) Notice: Subject to any disclaimer, the term of this patent is extended or adjusted under 35 U.S.C. 154(b) by 0 days.

(21) Appl. No.: 09/568,144

(22) Filed: May 10, 2000

(51) Int. Cl.$^7$ ................................................ B64G 1/64
(52) U.S. Cl. .................... 244/158 R; 102/377
(58) Field of Search ............................ 244/158 R, 161, 244/131, 120; 102/377, 378; 285/407, 408, 409, 411, 412, 413, 414; 220/320, 321

(56) References Cited

U.S. PATENT DOCUMENTS

| | | | |
|---|---|---|---|
| 2,967,482 A | * | 1/1961 | Toomey |
| 3,109,216 A | * | 11/1963 | Brown |
| 3,122,098 A | * | 2/1964 | Glennan |
| 3,404,649 A | * | 10/1968 | Valihora |
| 4,715,565 A | * | 12/1987 | Wittmann |
| 5,318,255 A | * | 6/1994 | Facciano et al. |
| 5,603,595 A |   | 2/1997 | Nygren, Jr. |

FOREIGN PATENT DOCUMENTS

| | | |
|---|---|---|
| EP | 0 493 211 | 7/1992 |
| EP | 0 905 022 | 3/1999 |
| WO | 01/02248 | 1/2001 |

\* cited by examiner

*Primary Examiner*—Charles T. Jordan
*Assistant Examiner*—T. Dinh
(74) *Attorney, Agent, or Firm*—Swidler Berlin Shereff Friedman, LLP

(57) ABSTRACT

A device for releasably connecting a first part and a second part of a spacecraft. A clamp is operable to releasably connect the first part and the second part of the spacecraft and to store a prestress strain energy releaseable upon separation of the first part and second part of the spacecraft. The clamp includes a first end and a second end. At least one energy storing system is operable to convert at least a portion of the prestress on the clamp to rotational energy upon opening of the clamp and separation of the first part and the second part of the spacecraft. The energy storing system includes a first fitting part that includes a threaded section, a second fitting part that includes a threaded section, and a connecting device that includes a threaded section complementary to and operable to engage the threaded section of the first fitting part and the second fitting part. The connecting device is operable to link the first end and the second end of the clamp. During separation the fitting parts and the connecting device are operable to rotate in relation to one another to release the first fitting part and second fitting part from the connecting device.

8 Claims, 3 Drawing Sheets

DEVICE AND METHOD FOR CONNECTING TWO PARTS OF A CRAFT

TECHNICAL FIELD

The invention presented here relates to a device on a spacecraft comprising a first craft part, a second craft part detachable from the fist craft part, as well as a clamp, in which there is a prestress that is released on separation, for connecting these said parts.

STATE OF THE ART

The use of a so-called clamp comprising shoes and a band to effect a detachable connection between a satellite and a carrier rocket is known. In the assembled state the shoes bear on cylindrical structural parts of the satellite and the carrier rocket's adaptor at the same time as the band is prestressed around the shoes so that these exert compressive forces on the structural parts. This prestress means that in the band and the adjoining structural parts there is stored strain energy, which is released when the satellite separates from the carrier rocket.

For the separation of the satellite and carrier rocket from each other, the band comprises an opening mechanism, which almost instantaneously opens the band. The opening mechanism normally operates by some pyrotechnic powered separation device. When the stored strain energy is released, it is converted to kinetic energy, mainly in the form of vibrations in the structural parts and translation motions in the end of the hand. The vibrations jeopardize damaging sensitive instrumentation in the satellite, and the band movements may interfere with the satellite. It is obvious that the heavier the satellite, the harder the clamp has to be tightened and the greater the strain energy stored in the band and in adjoining structural parts.

DESCRIPTION OF THE INVENTION

According to an embodiment of the present invention a device on a space craft is provided comprising a first craft part, a second craft part detachable from the first craft part, as well as a clamp, in which there is a prestress that is released on separation, for connecting these said parts, wherein the device comprises at least one energy storing means devised to convert, during separation, at least part of the prestress-stored strain energy to rotational energy.

It is usual for the first craft part to be comprised of a carrier rocket and the second craft part to be comprised of a satellite, but it may as well be so that the first craft part is a satellite and the second craft part is a probe or other examples of combinations of craft parts.

In one embodiment, the energy storing device is realised by two fitting parts, each attached to a respective band end, with a threaded section for engaging with a complementary threaded section present in a connecting device devised to link the ends of the clamp to each other, whereby, during separation, the fitting parts and the connecting device are devised to rotate in relation to one another. On rotation the fitting parts move axially outwards in relation to the connecting device, whereby the stored strain energy in the clamp and the structural parts decreases.

In this embodiment axial loads are kept internally in the connecting device and the fitting parts and do not need to be borne by the bearing between the connecting device and its fastening device. This permits a simple construction for the connecting device, without the need for, for example, axial needle roller bearings, which tend to function unsatisfactorily at high revolutions.

In order to obtain a balanced construction, where little or no axial loads, from the prestress forces in the fitting parts, need to operate on the connecting device, the complementary threaded sections are essentially coaxial in the connecting device.

In a preferred embodiment the fitting, parts and the connecting device are designed in such a way that the process of separation is sufficiently long to allow the occurrence of vibrations in at least part of the craft part to be, at least partly, prevented.

The threaded sections and their complementary equivalents are preferably designed so that a tensile force caused by said stress action, between each fitting part and the connecting device, during separation causes them to rotate in relation to one another.

In this embodiment a retaining mechanism is devised to lock the engagement so as to maintain the prestress, so that actuating the retaining mechanism out of position induces initiation of the separation.

Preferably, the threaded sections of the fitting parts have opposite thread directions and the fitting parts are prevented from rotating. In this embodiment, the retaining mechanism prevents the connecting device from rotating, which means that, during separation, only the connecting device rotates in order to disengage. A suitable connecting device would be a flywheel.

The threaded sections of the fitting parts have male threads while the threaded sections of the connecting device have female threads.

In a simple and practical embodiment, the connecting device and the fitting parts are at least partly contained in a housing, mounted on one of the craft parts, designed to prevent rotation of the fitting parts.

EMBODIMENTS OF THE INVENTION

Figure 1:
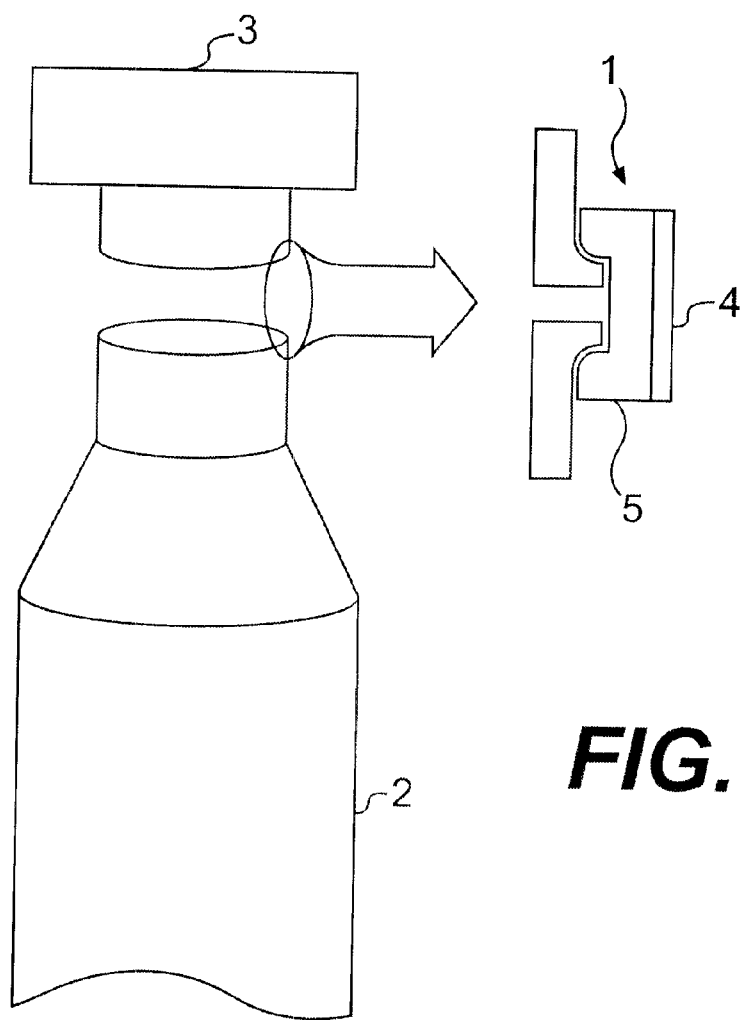
FIG. 1 shows an outline of a carrier rocket and a satellite detachable from the sad carrier rocket, as well as a cross-section view of a clamp for connecting these said parts.

Reference number 1 in FIG. 1 denotes a so-called clamp for providing a detachable connection between two craft parts 2, 3 in a space craft, where, for example, one craft part 2 is a carrier rocket, and the other craft part 3 is satellite that after launching is to be detached from the carrier rocket 2.

Figure 2:
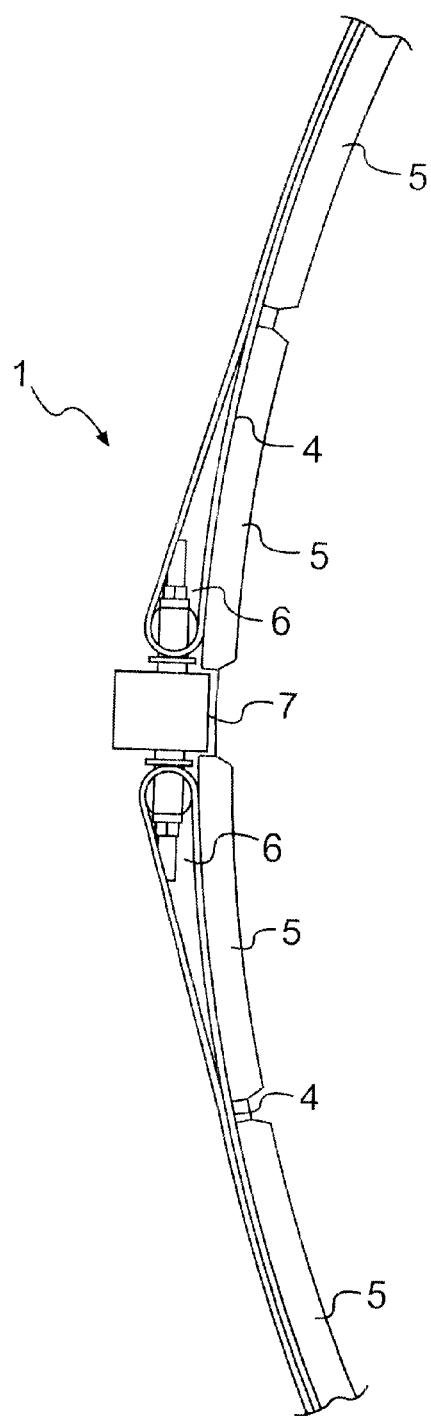
FIG. 2 shows an example of the clamp in FIG. 1 for connecting the carrier rocket and the satellite.

As can be seen in FIG. 2, the clamp 1 consists of a band 4 and shoes 5. The shoes 5 bear on the cylindrical structural parts of the carrier rocket 2 and the satellite 3 and are held in place by means of the band 4, which is prestress about the shoes so that they exert compressive forces on the structural parts. Consequently, the prestress means that in the band 4 and the adjacent structural parts 2, 3, strain energy is stored by the band being stretched and the structural parts being compressed somewhat. The band 4 can be either a flexible band or be made of connected parts which are arc-shaped, rigid and articulate with each other, and which together form a circle. In the example in the figure, both ends of the band are arranged in loops 6 and are held together by a band opening mechanism 7. There are, however, for an expert obvious, several ways to design the band ends so they can be held together by the band opening mechanism 7. The band opening mechanism 7 is devised so that, during separation, it causes the conversion of the strain energy stored in the structural parts and the clamp to other forms of energy in a controlled way.

Figure 3:
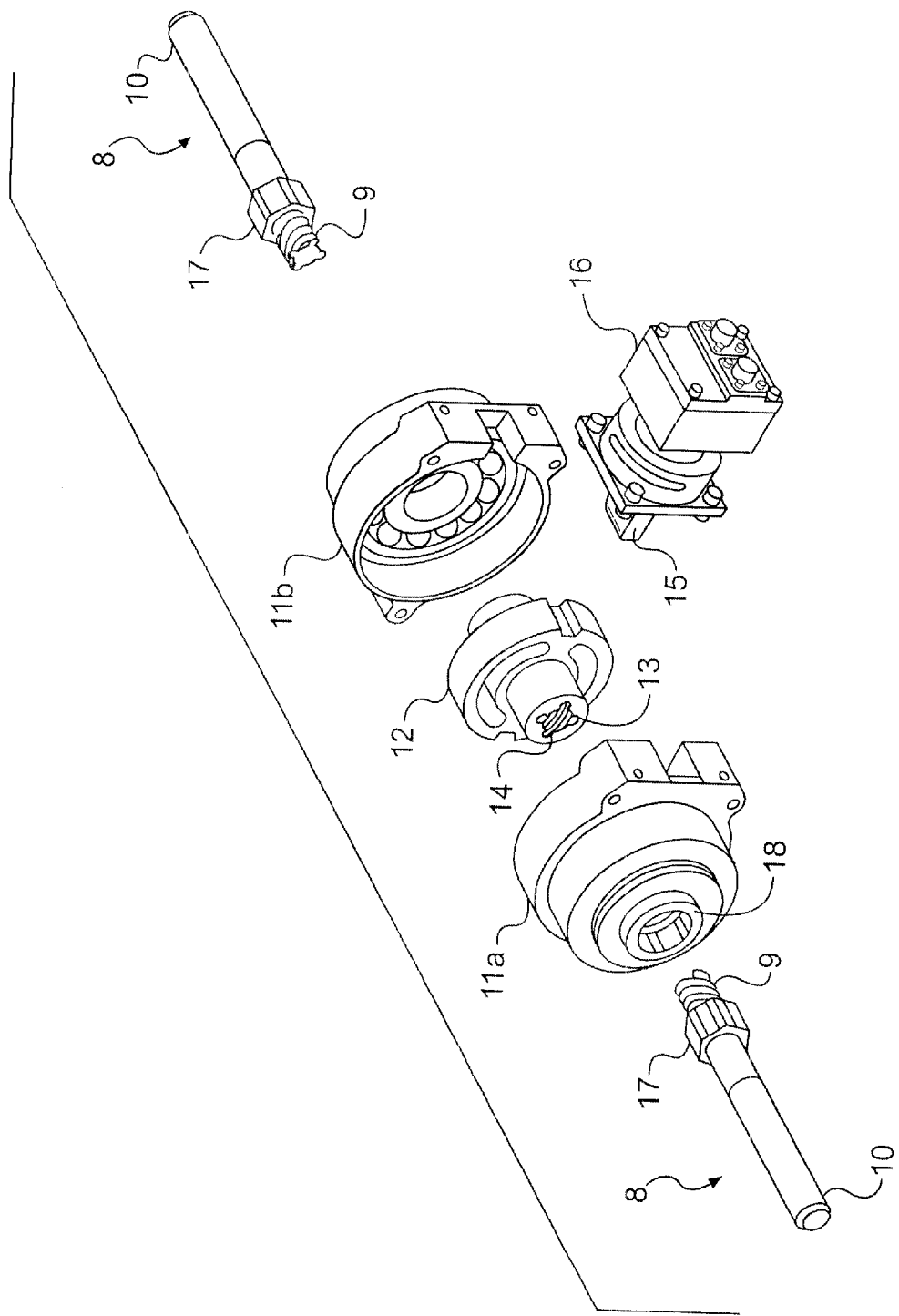
FIG. 3 shows schematically an example of an opening mechanism in the clamp according to FIG. 2.

In FIG. 3 the band opening mechanism 7 consists of two continuous fitting parts 8, each of which is equipped with a threaded section 9. In the example shown in the figure the fitting parts are designed as conventional bolts having male threaded sections 9, where one bolt is right hand threaded and the other is left hand threaded At one end 10 opposite the threaded section, each bolt 8 is attached to the end of the associated clamp. In the example shown in the figure the bolts 8 have, at their ends 10, a threaded section for coupling to the end of the accompanying clamp. With the ends of the clamp designed in the form of loops 6 as in FIG. 2, there is, in the band at the top of the loop, an opening devised to receive the end 10, whereby the band opening mechanism 7 is connected to the clamp by running the end 10 through the opening and subsequently threading a nut on the bolt 8 at the end 10.

In addition to a nut, the opening mechanism 7 further comprises a working part 12 designed to receive from both directions the threaded sections of the bolts 8. Accordingly, the nut part 12 has female threads 14 designed to match the bolts' 8 threaded sections 9, whereby the thread direction of the threads is such that the right hand threaded section 9 can be threaded in the nut part from one of its ends and the left hand threaded section from its other end On fitting the clamp 1, first the threaded section of the each bolt 8 engages with the matching threaded section 14 of the nut part 12. Next, the thus formed thread joint is fitted in a housing consisting of two nieces 11a, 11b, which encloses the nut part 12, and the bolts 8 for part of their length The housing 11a, 11b is fixed to one of the craft parts. Then the clamp is prestressed around the craft parts, and the opening mechanism 7 is connected to the ends of the clamp by connecting the ends 10 of the bolts to the ends of the clamp, for example in the way described above.

The geometry of the bolts' 8 male threads and the nut part's 12 female threads is chosen so that the prestress-produced tensile force acting between each bolt 8 and the nut part's bearing will induce them to rotate in relation to each other. In order to lock the engagement, the housing 11a, 11b and the bolts 8 in the example in the figure are designed so that the bolts after fitting in the housing are mobile in the axial direction in relation to the housing, but prevented from rotation in relation to the housing when the nut part is locked its position. The bolts 8 and the housing 11a, 11b are designed to prevent the bolt, 8 from rotating, and this is achieved by having each bolt constructed with a flange 7 and each housing part 11a, 11b constructed with a sleeve 18, internally designs to match the male radial surface of flanges 17, where the external radial surface of flange 17 is, for example, designed as a nut, thereby producing a guide so that during the separation of the clamp, the flange 17 moves axially in the sleeve 18. In an alternative embodiment the bolts are prevented from rotating by their being secures to the ends of the clamp. However, at present it is preferred to attach the bolts to ends facing the nut part rather than the ends facing the ends of the clamp so as to achieve short load distance and also to minimise stress in the bolts.

The opening mechanism 7 comprises a retaining mechanism 15, which, so as to maintain the prestress after assembling in the housing 11a, 11b, keeps the position of the nut part 12 locked in relation to the housing 11a, 11b, thereby preventing the nut part 12 from rotating. For the expert it is obvious that such retaining mechanisms can be designed in a variety of ways and how the mechanisms could be constructed.

In the example in FIG. 3, the retaining mechanism 15 is a wedge that can be shifted out of its position by an actuator 16. When the wedge is shifted out of its position, the nut part is permitted to rotate. The rotation induces the bolts 8 to move axially outwards from the nut part until disengagement has been effected. While the bolt is moving outwards in the nut part, part of the strain energy stored in the structural parts and in the clamp is converted to kinetic energy in the form of rotational energy in the nut part.

As described above, the nut part 12 rotates during disengagement, which is why the nut part constitutes the medium in which the prestress-stored stain energy is stored in order to be converted, during the process of separation, to kinetic energy in the form of rotational energy. To achieve a relatively drawn out process of separation, the nut part 12 is preferably a flywheel. In one example, the flywheel 12 has a through hole 13 formed along its a of rotation. In a further example, the hole does not penetrate the flywheel but only occurs at each end of the flywheel. At each end, the hole is constructed with the above-mentioned female thread 14. The hole 13 is constructed so that it is symmetrical in the flywheel 12, thereby obtaining a balanced construction, whereby little or no static radial loads need act on the bearing in the flywheel 12. Since an axial load acting on the flywheel bearing in one direction is cancelled by an equivalent load in the opposite direction, the flywheel bearing does not need to bear any axial loads.

A problem which occurs on carrier rocket/satellite separation is that the release of the clamp gives rise to vibrations in the structural parts of the satellite. Such vibrations tend to damage the satellite's electronic equipment, which in the context of space is naturally completely unacceptable. For the purpose of preventing vibrations from arising on separation, the process of releasing the engagement is controlled so that it is at a minimum longer than a quarter of the period for undesirable, damaging self-oscillations in the craft parts. In one example, the process is controlled so that it is twice as long as a quarter of the longest undesirable self-oscillation period.

Parameters influencing the process include dimensions of the bolts and the flywheel, the mass moment of inertia of the flywheel, coefficients of friction, and the geometrical design of the threads in the bolts and the flywheel. Dimensioning of the bolts and flywheel, and thus evens the flywheel's mass moment of inertia, is mainly dictated by the strength requirements, as well as the space available, which means that to some extent it is the coefficients of friction, and above all the thread geometry that are the parameters that can be modified to create the desirable properties of the process. The coefficients of friction depend on the choice of material and can be regulated, for example, by covering, with a friction reducing lining, at least the parts of the bolts and the flywheel that, on engagement, bear on each other. As is obvious for experts in the field, there are many thread geometry parameters which are in turn modifiable so as to achieve the desirable properties, for example length of engagement, pitch of thread, number of thread grooves and so on. Note that, as a consequence, the coefficients of friction and geometrical design of the threads must be chosen, partly so that only tensile forces are required and no torsion moment need be applied to make the flywheel rotate, and partly so that the process of separation is long enough to eliminate, or at least reduce, self-oscillations in the craft parts. Furthermore, by having the process of separation drawn out in time, the part of the strain energy that prior to separation as stored in the clamp will, partly at least, be taken up by the flywheel, thereby reducing the risk that the ends of the clamp, after being released from the opening mechanism 7, will destroy components in the craft parts.

Dimensioning of the bolts and flywheel, and choice of friction coefficients and thread geometries so as to achieve the characteristics of the opening mechanism 7 described above involve skilled measures, wholly depending on prevailing circumstances such as the dimensions and weight of the craft parts.

For an expert, it is obvious that designs are functionally equivalent to that described above can be achieved in a variety of ways. For example, the bolts 8 could be replaced by nuts, and the flywheel 12 could be provided with male treads.

What is claim is:

1. A device for releasably connecting a first part and a second part of a spacecraft, comprising:
   a clamp operable to releasably connect the first part and the second part of the spacecraft and to store a prestress strain energy releaseable upon separation of the first part and second part of the spacecraft, the clamp comprising a first end and a second end; and
   at least one energy storing means operable to convert at least a portion of the prestress on the clamp to rotational energy upon opening of the clamp and separation of the first part and the second part of the spacecraft, the energy storing means comprising:
      a first fitting part comprising a threaded section,
      a second fitting part comprising a threaded section, and
      a connecting device comprising a threaded section complementary to and operable to engage the threaded section of the first fitting part and the second fitting part,
   wherein the connecting device is operable to link the first end and the second end of the clamp, and wherein during separation the fitting parts and the connecting device are operable to rotate in relation to one another to release the first fitting part and second fitting part from the connecting device.

2. The device according to claim 1, wherein the threaded sections are essentially coaxial when engaging the connecting device.

3. The device according to claim 1, wherein the first fitting part, the second fitting part and the connecting device are arranged so that separation of the first part and second part of the spacecraft takes sufficiently long to at least partially prevent the occurrence of vibrations in at least one part of the spacecraft.

4. The device according to claim 1, wherein the threaded sections of the first fitting part and the second fitting part and the threaded section of the connecting part are designed such that a tensile force between each fitting part and the connecting device caused by the prestress causes the fitting parts and the connecting device to rotate in relation to each another during separation of the first part and the second part of the spacecraft, the device further comprising:
   a retaining mechanism operable to lock the engagement so as to maintain the prestress, whereby actuating the retaining mechanism out of position induces initiation of the separation.

5. The device according to claim 4, wherein the threaded sections of the first fitting part and the second fitting part comprise opposite thread directions, such that the fitting parts are prevented from rotating, and wherein the retaining mechanism is arranged to prevent the connecting device from rotating, and wherein the retaining mechanism operable to prevent release of the prestress, such that during separation of the first part and second part of the spacecraft only the connecting device rotates.

6. The device according to claim 5, further comprising:
   a housing mounted on the first part or the second part of the spacecraft and operable at least partially contain the connecting device, the first fitting part, and the second fitting part and to prevent rotation of the first fitting part and the second fitting part.

7. The device according to claim 5, herein the connecting device comprises a flywheel.

8. A device according to claims 1, wherein the threaded sections of the first fitting part and the second fitting part comprise male threads and the threaded section of the connecting device comprises female threads.

* * * * *

UNITED STATES PATENT AND TRADEMARK OFFICE
CERTIFICATE OF CORRECTION

PATENT NO. : 6,454,214 B1
DATED : September 24, 2002
INVENTOR(S) : Shawn H. Smith, Bengt Mortberg and Ingvar Bengtsson It is certified that error appears in the above-identified patent and that said Letters Patent is hereby corrected as shown below:

<u>Title page,</u>
Item [75], should read:
-- [75] Inventor: Shawn H. Smith, Boulder, CO (US)
      Bengt Mortberg, Linkoping, Sweden
      Ingvar Bengtsson, Linkoping, Sweden --.

Signed and Sealed this

Twentieth Day of September, 2005

JON W. DUDAS
*Director of the United States Patent and Trademark Office*